United States Patent
Falla et al.

(10) Patent No.: US 8,262,434 B2
(45) Date of Patent: *Sep. 11, 2012

(54) METHOD OF MOLDING A BREAST-RECEIVING CUP FOR A GARMENT

(75) Inventors: Gloria Falla, Demarest, NJ (US); Roger D. Warren, Claremont, NC (US); Thomas S. Wood, Denver, NC (US)

(73) Assignee: BBI Branded Apparel Enterprises, LLC, Winston-Salem, NC (US)

( * ) Notice: Subject to any disclaimer, the term of this patent is extended or adjusted under 35 U.S.C. 154(b) by 260 days.

This patent is subject to a terminal disclaimer.

(21) Appl. No.: 12/652,092

(22) Filed: Jan. 5, 2010

(65) Prior Publication Data
US 2010/0227530 A1 Sep. 9, 2010

Related U.S. Application Data

(60) Division of application No. 11/150,985, filed on Jun. 13, 2005, now Pat. No. 7,666,059, which is a continuation-in-part of application No. 10/631,474, filed on Jul. 31, 2003, now abandoned.

(51) Int. Cl.
*A41C 3/00* (2006.01)
(52) U.S. Cl. .................. 450/39; 450/92; 450/93; 450/58
(58) Field of Classification Search .................. 450/39, 450/54–58, 92, 93; 425/394, 396, 398, 408, 425/410; 264/319, 320, 324, 327, 325
See application file for complete search history.

(56) References Cited

U.S. PATENT DOCUMENTS

| | | | |
|---|---|---|---|
| 2,128,600 A | 8/1938 | Bergmann | |
| 2,190,807 A | 2/1940 | Steinberger | |
| 2,378,908 A | 6/1945 | Blum | |
| 2,540,521 A | 2/1951 | Hoffman | |
| 2,541,147 A | 2/1951 | Becker | |
| 2,609,539 A | 9/1952 | Shearer | |
| 2,629,099 A | 2/1953 | Phillips | |
| 3,021,845 A | 2/1962 | Smith | |
| 3,058,154 A * | 10/1962 | Howard et al. | 156/222 |
| 3,101,717 A | 8/1963 | Korman | |

(Continued)

FOREIGN PATENT DOCUMENTS
EP 1440626 A1 7/2004
(Continued)

OTHER PUBLICATIONS

Household Textiles, "Spacer (Distance) Fabrics", www.monarchknitting.com, Jan 20, 2003.

(Continued)

*Primary Examiner* — Gloria Hale
(74) *Attorney, Agent, or Firm* — Womble Carlyle Sandridge & Rice LLP

(57) ABSTRACT

A method is provided for molding a breast-receiving cup for a garment, comprising laminating a support fabric to a lofted material to form a lofted assembly, positioning the lofted assembly in a molding apparatus having a first mold with a projecting element and a second mold having a recessed element, and closing together the first mold and the second mold while maintaining a uniform preset gap between the projecting element and the recessed element to form a molded lofted assembly in the shape of a breast-receiving cup.

5 Claims, 6 Drawing Sheets

U.S. PATENT DOCUMENTS

| | | | |
|---|---|---|---|
| 3,167,816 A | 2/1965 | Howard et al. |
| 3,266,495 A | 8/1966 | Sachs |
| 3,320,346 A | 5/1967 | Galitzki |
| 3,331,906 A | 7/1967 | Adams |
| 3,399,678 A | 9/1968 | Faron |
| 3,444,589 A | 5/1969 | Brown |
| 3,464,418 A | 9/1969 | Silverman |
| 3,527,858 A | 9/1970 | Braxton et al. |
| 3,597,800 A * | 8/1971 | Silverman | 425/290 |
| 3,799,174 A | 3/1974 | Howard |
| 3,799,721 A | 3/1974 | Howard |
| 3,799,727 A | 3/1974 | Howard |
| 3,799,728 A | 3/1974 | Howard |
| 3,799,729 A | 3/1974 | Hagen |
| 3,832,108 A | 8/1974 | Posch et al. |
| 3,880,561 A | 4/1975 | Ferro |
| 3,891,378 A | 6/1975 | Belmuth et al. |
| 3,934,593 A | 1/1976 | Mellinger |
| 3,947,207 A | 3/1976 | Magidson et al. |
| 3,962,392 A | 6/1976 | Conner, Jr. |
| 3,981,378 A | 9/1976 | Potter |
| 3,981,670 A | 9/1976 | Levy |
| 4,008,029 A | 2/1977 | Shokite |
| 4,013,750 A | 3/1977 | Magidson et al. |
| 4,025,597 A | 5/1977 | Sawamoto |
| 4,080,416 A * | 3/1978 | Howard | 264/258 |
| 4,127,374 A | 11/1978 | Ammeraal |
| 4,143,662 A * | 3/1979 | Fisher | 450/53 |
| 4,162,885 A | 7/1979 | Asel |
| 4,172,002 A | 10/1979 | Gluckin |
| 4,244,249 A | 1/1981 | DiTullio |
| 4,247,351 A | 1/1981 | Rechenberg |
| 4,250,137 A | 2/1981 | Riedler |
| 4,284,400 A | 8/1981 | Kaspar et al. |
| 4,372,321 A * | 2/1983 | Robinson | 450/39 |
| 4,645,629 A | 2/1987 | Stern |
| 4,701,230 A | 10/1987 | Loi |
| 5,035,758 A | 7/1991 | Degler et al. |
| 5,098,330 A | 3/1992 | Greenberg |
| 5,108,691 A | 4/1992 | Elliott |
| 5,141,690 A | 8/1992 | Marshall |
| 5,693,164 A | 12/1997 | Chang |
| 5,783,277 A | 7/1998 | Rock et al. |
| 6,083,080 A | 7/2000 | Lawson et al. |
| 6,165,047 A | 12/2000 | Scott et al. |
| 6,213,841 B1 | 4/2001 | Kuo |
| 6,306,006 B1 | 10/2001 | Cheng |
| 6,398,620 B1 | 6/2002 | Huang |
| 6,406,352 B1 | 6/2002 | Cheng |
| 6,409,865 B1 | 6/2002 | Yates |
| 6,425,800 B1 | 7/2002 | Huang |
| 6,439,959 B1 | 8/2002 | Magrone et al. |
| 6,796,876 B2 | 9/2004 | Luk |
| 6,805,610 B2 | 10/2004 | Luk |
| 6,805,611 B2 | 10/2004 | Luk |
| 6,805,612 B1 | 10/2004 | Luk |
| 6,811,464 B2 | 11/2004 | Li |
| 6,837,771 B2 | 1/2005 | Falla |
| 6,837,772 B1 | 1/2005 | Luk |
| 6,878,033 B2 | 4/2005 | Luk |
| 6,881,123 B1 | 4/2005 | Klakauskas |
| 2002/0002023 A1 | 1/2002 | Nakanishi |
| 2003/0082994 A1 | 5/2003 | Mitchell et al. |
| 2003/0181129 A1 | 9/2003 | Getman |
| 2004/0137103 A1 | 7/2004 | Lin |
| 2004/0224604 A1 | 11/2004 | Luk |
| 2004/0224606 A1 | 11/2004 | Lin |
| 2004/0237597 A1 | 12/2004 | Oya et al. |
| 2005/0051923 A1 | 3/2005 | Warren |
| 2006/0141905 A1 | 6/2006 | Lau |

FOREIGN PATENT DOCUMENTS

| | | |
|---|---|---|
| JP | 2001-234402 A | 8/2001 |
| JP | 2002-088523 A | 3/2002 |
| JP | 2002-155403 A | 5/2002 |
| WO | WO-2005/012614 A2 | 2/2005 |

OTHER PUBLICATIONS

Christian Bohm, "DG 506-15—Technical Warp Knits Produced on the DG 506-15", www.liba.de/raschel/rac-15-art.htm, Jan. 20, 2003.

S. Raz, "The Karl Mayer Guide to Technical Textiles," Report WE 208/1/4/2000, Karl Mayer Textilmaschinenfabrik GmbH, Obertshausen, 2000.

OPTO Texform GmbH, OPTPTEXFORM—Molding Machines 2040, http://www.optotexform.de/molding/2040-e.html, Jan. 20, 2003.

\* cited by examiner

METHOD OF MOLDING A BREAST-RECEIVING CUP FOR A GARMENT

RELATED APPLICATION

This application is a divisional of U.S. patent application Ser. No. 11/150,985, filed on Jun. 13, 2005, now U.S. Pat. No. 7,666,059, which is a continuation-in-part of U.S. application Ser. No. 10/631,474, filed on Jul. 31, 2003, now abandoned, the contents of which are incorporated by reference herein in their entirety.

BACKGROUND OF THE INVENTION

1. Field of the Invention

The present invention relates to a method for molding garments and the garments made. More particularly, the present invention relates to a method for molding a lofted material having a laminated support layer and the resultant garment.

2. Description of the Prior Art

Various methods and mechanisms for molding different types and assemblies of material have been developed and are known. For example, U.S. Pat. No. 3,464,418 provides an apparatus and method for making brassiere pads from bonded non-woven fibrous batting material, U.S. Pat. No. 4,025,597 provides a method of making a brassiere cup from a soft fibrous board material, U.S. Pat. No. 4,080,416 provides a method for making multi-layered seamless brassiere pads, and U.S. Pat. No. 4,250,137, provides a process for preparing breast pads or fronts such that the pads are centrally soft and peripherally firmer.

Notwithstanding that which is known, there remains a continuing need for improved methods for molding lofted material having a laminated support layer to provide a three dimensional shape thereto without compromising the loft characteristics associated with such material. Problems heretofore associated with various processes of molding a lofted material include at least the following: (1) thinning of material at points of increased pressure or applied heat, or both, such as for example, the apex of a bra cup or pad, (2) requiring relatively complicated or additional structural elements, or both to facilitate a desired result, for example, spacer devices or vacuum systems, and (3) requiring that heat, pressure or both be avoided at relatively substantial portions of the material being molded, which can complicate the molding process.

SUMMARY OF THE INVENTION

It is an object of the present invention to provide a method for molding lofted material having a nylon laminated support layer.

It is another object of the present invention to provide a garment that is made from a lofted material that has a nylon laminated support layer that is molded to maintain the loft characteristics of the lofted material.

It is yet another object of the present invention to provide a garment that is molded from a lofted material that has a laminated synthetic support layer.

It is still yet another object of the present invention to provide a brassiere that is molded from a lofted assembly having a lofted material and a laminated synthetic support layer that is deeply molded to provide support for a large sized brassiere.

These and other objects and advantages of the present invention are achieved by a molding apparatus with at least a first die or mold with a projecting element and a first level portion, and a second die or mold with a recessed element and a second level portion. The projecting element and the recessed element are formed such that when the first level portion of the first mold and the second level portion of the second mold are brought into relatively close relation, a uniform preset distance or gap is created between the projecting element and the recessed element. The gap is preferably adjustable to accommodate the loft of different materials. The first mold and second mold each are preferably selectively and/or independently heatable and configured as appropriate to facilitate the following material molding method.

The method for molding the lofted material essentially comprises the steps of first placing a pre-cut piece of nylon support fabric that is in a pre-determined position on a piece of lofted material, laminating the two materials together to form a lofted assembly, and positioning the lofted assembly in the molding apparatus. Thereafter, the first mold is closed in relation to the second mold, or vice-versa, sandwiching the lofted assembly therebetween such that the portion of the lofted assembly situated between the first and second level portions is compressed and the portion of the lofted assembly situated between the projecting element and recessed element is compressed only to the extent desired, or not at all. The extent of compression is adjustable. Following this closing step is a step of opening the first mold in relation to the second mold after a period of selectively providing pressure and/or heat as appropriate for the desired molding result. The resulting molded lofted assembly preferably provides a balance of comfort, support and durability.

BRIEF DESCRIPTION OF THE DRAWINGS

Other and further objects, advantages and features of the present invention will be understood by reference to the following specification in conjunction with the accompanying drawings, in which like reference characters denote like elements of structure.

DETAILED DESCRIPTION OF THE INVENTION

Figure 1:
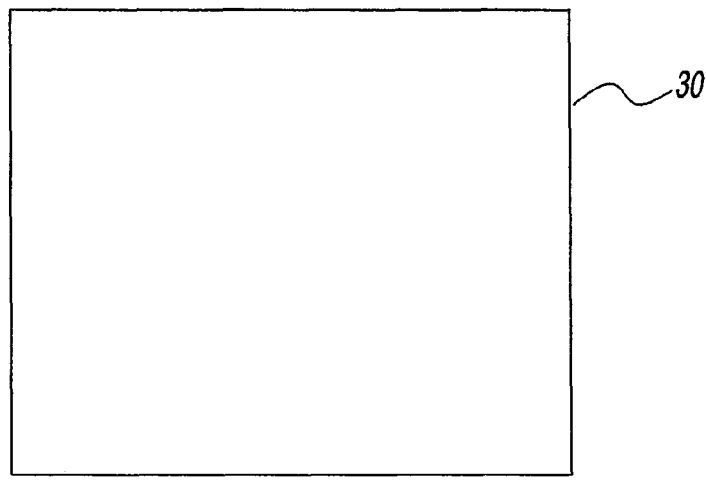
FIG. 1 is a top view of the lofted material that is to be molded in accordance with an illustrative embodiment of the present invention.

Referring to the drawings in general, and in particular to FIG. 1, there is shown an illustrative embodiment of the lofted material generally represented by reference numeral 30. As used herein, as used herein, the term "lofted material" includes foam and circularly knitted and/or warp knitted single ply materials that may be a variety or combination of materials, such as batting, spacer fabric, etc. Spacer fabric may be a polyester and/or nylon fabric. Lofted material 30 is sized to form a deep breast-receiving cup for a brassiere upon being molded.

Figure 2:
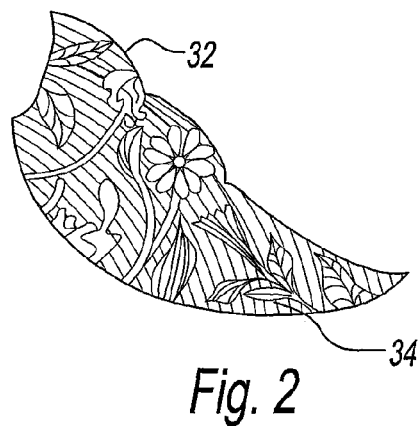
FIG. 2 is a top view of the pre-cut piece of synthetic support fabric that is to be laminated to the lofted material in accordance with the present invention.

Referring to FIG. 2, support fabric 32 is shown. Support fabric 32 is cut in the shape of a crescent to ensure a comfortable and close fit at the lower lateral portion of the finished breast-receiving cup. Although the shape of support fabric 32 is shown as a crescent, other shapes capable of offering comfort and support to the wearer could also be used. Support fabric 32 may be any synthetic material. Preferably, the support fabric 32 is a warp knit material, such as nylon Jacquard, lace, etc. In all instances, support fabric 32 provides the level of comfort and support to the breasts of the wearer that would otherwise not be available without the enhanced support. Support fabric 32 may include a design such as, for example, a floral design; however, any design, such as a geometric pattern, also may be used.

Figure 3:
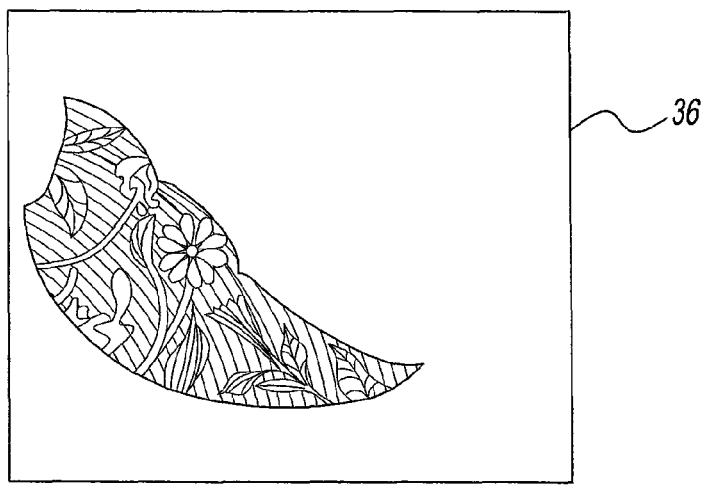
FIG. 3 is top view of the laminated assembly of lofted material and the synthetic support fabric in accordance with the present invention.

In FIG. 3, support fabric 32 is pre-positioned on lofted material 30 before the two pieces of fabric are laminated together. A layer of adhesive is placed on support fabric 32 before it is placed on lofted material 30. The adhesive is a glue that is heat activated and may comprise a film, a web, or polyester. The temperature required to laminate support fabric and lofted material 30 is between approximately 320° F. to 360° F. The lamination process is of a temperature that will preserve the loft and the aesthetic appeal of the lofted material 30 and the support fabric. After the lamination process, lofted material 30 and the support fabric 32 together form lofted assembly 36.

Figure 4:
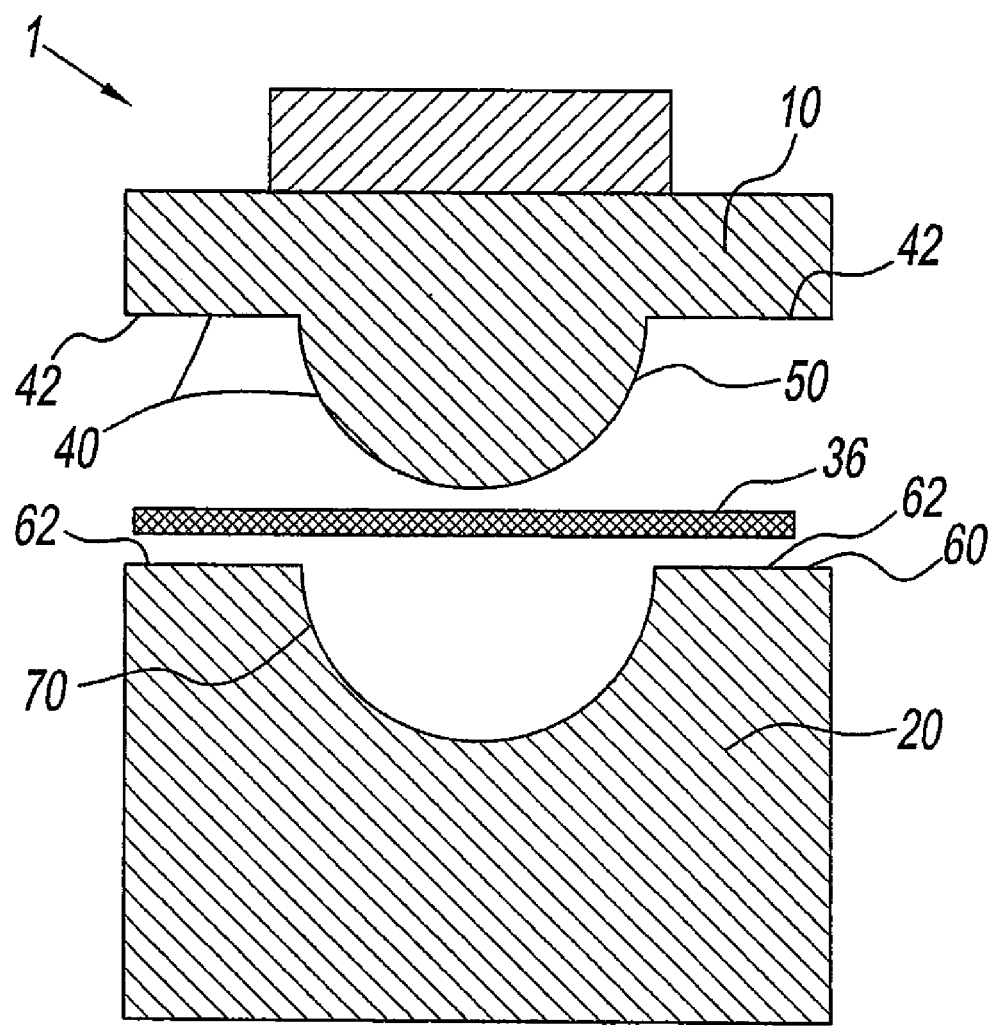
FIG. 4 is a cross-sectional side view of an apparatus for molding a lofted assembly in accordance with an illustrative embodiment of the present invention with the apparatus shown in an open position.

Referring to the drawings and, in particular to FIG. 4, there is shown an illustrative embodiment of an apparatus for molding lofted assembly 36. The apparatus 1 preferably has at least two mold elements, a first mold 10 and a second mold 20. Preferably, the first mold 10 and the second mold 20 are complementary to one another.

First mold 10 and second mold 20 cooperate to mold or form a lofted assembly 36 positioned therebetween into a three-dimensional shape, such as, for example, that required by molded brassiere pads. Lofted assembly 36 may be any of a variety of materials or combination of materials and may be fashioned into a variety of forms, such as, for example, a garment.

Figure 9:
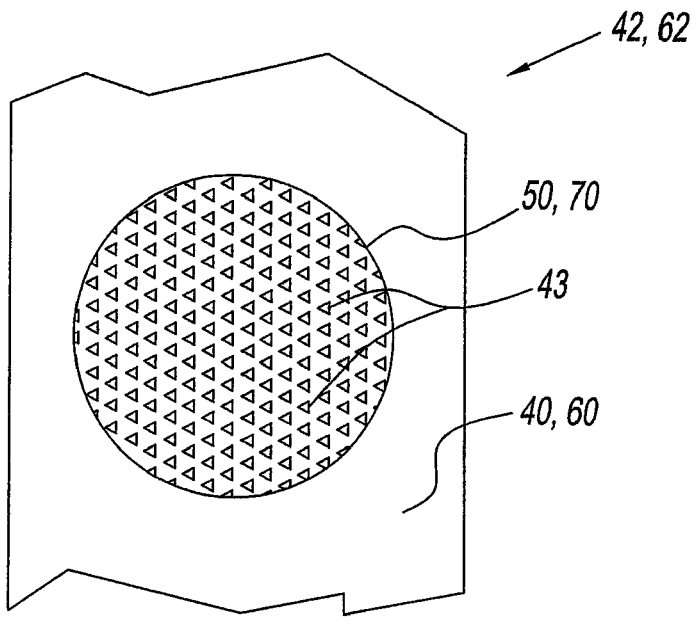
FIG. 9 is a plan view of yet another alternative apparatus for molding a lofted assembly.
Figure 10:
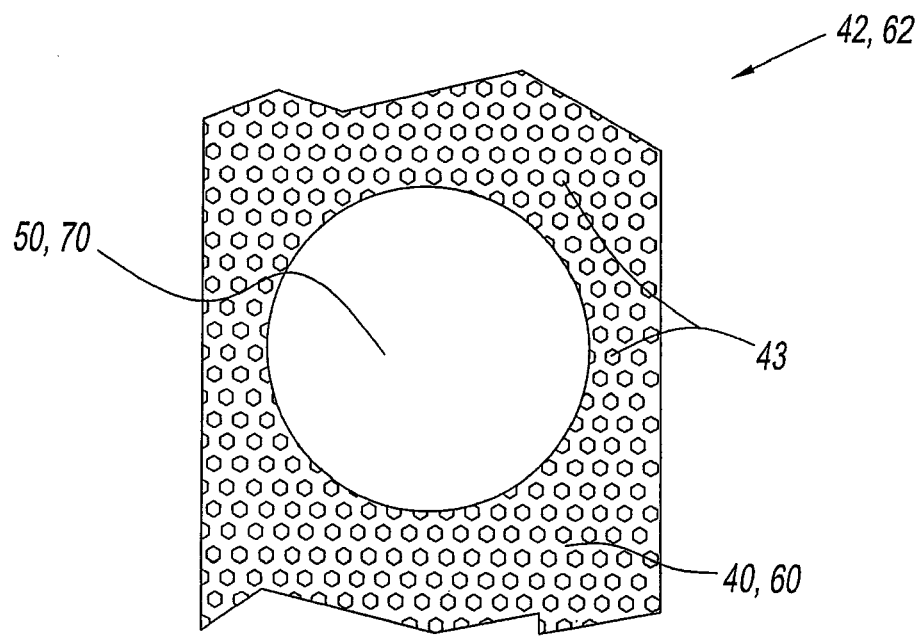
FIG. 10 is a plan view of still another alternative apparatus for molding a lofted assembly.
Figure 11:
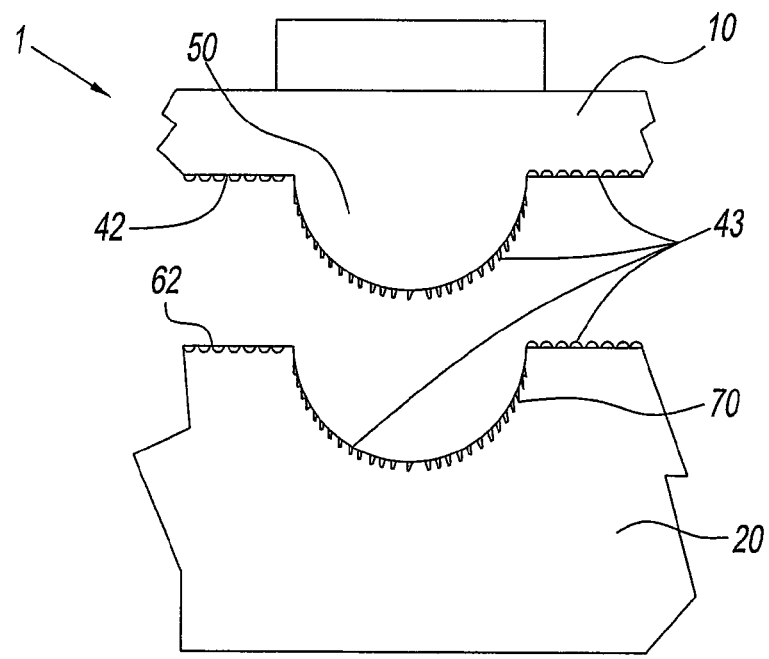
FIG. 11 is a side sectional view of yet still another alternative apparatus for molding a lofted assembly.
Figure 12:
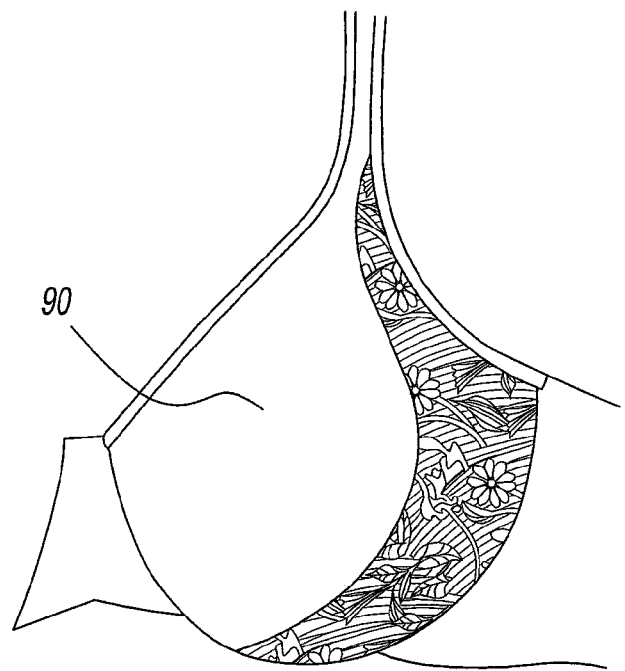
FIG. 12 is a perspective view of the lofted assembly molded in the form of a breast-receiving cup.

First mold 10 preferably has at least one first contact surface 40 with at least one projecting element 50 in the form of a dome. First contact surface 40 also has a first level portion 42 about projecting element 50. First contact surface 40 may also have any of a variety of other surface elements 43 associated therewith, such as, for example, one or more nodes, dimples, and/or teeth as shown in FIGS. 9 through 11. First contact surface 40 may be interchangeably associated with first mold 10. First mold 10 may be interchangeably associated with apparatus 1. The interchangeability of first contact surface 40 and/or first mold 10 provides apparatus 1 with further diversity in application or use.

Figure 7:
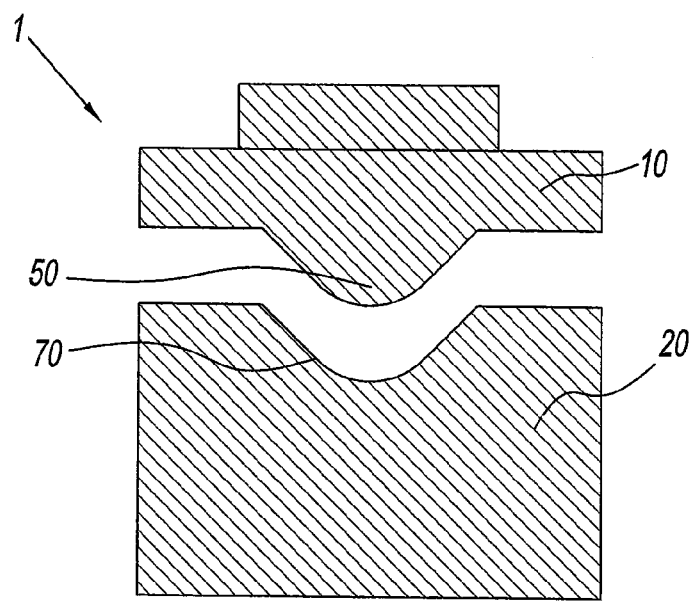
FIG. 7 is a side sectional view of an alternative apparatus for molding a lofted assembly.
Figure 8:
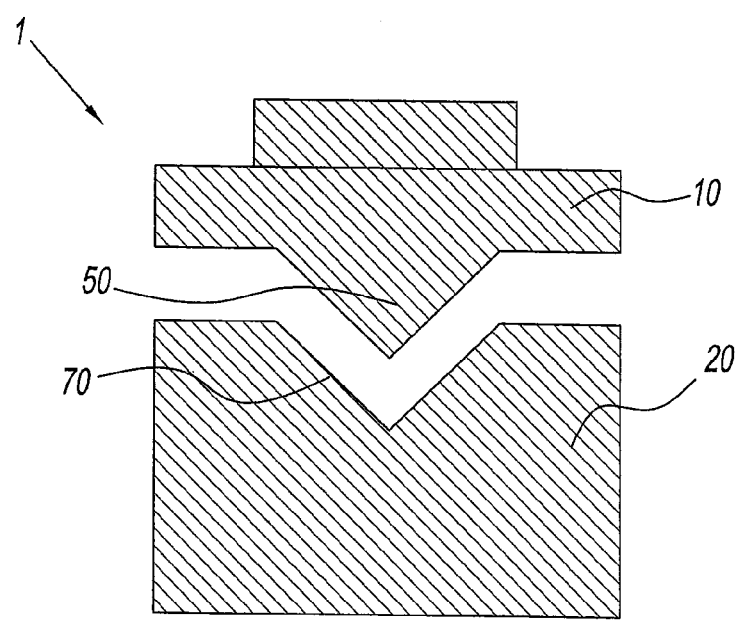
FIG. 8 is a side sectional view of another alternative apparatus for molding a lofted assembly.

First mold 10, first contact surface 40, projecting element 50, and/or first level portion 42 may be heatable. This heating may be accomplished in any of a variety of ways, such as, for example, via electric heating wires or rods associated with first mold 10. These heating wires or rods may conduct or transmit heat, via first mold 10, as appropriate, to provide any and/or all of the aforementioned elements thereof with sufficient heat for effective molding under a variety of different molding parameters. First mold 10 may have any shape, size, and/or configuration suitable for accomplishing one or more different molding operations. See, for example, FIGS. 7 and 8, which show alternative embodiments of first mold 10. It is noted that the present invention is not limited to those configurations discussed and/or shown and that other configurations are also within the scope of the present invention.

The surface elements 43 are suitable for achieving a variety of different molding effects. For example, surface elements 43 may be on either or both projecting element 50 and first level portion 42 to interact with lofted assembly 36 during the molding process. Surface elements 43 may be, for example, one or more piercing elements, heating or cooling elements, cushioning or insulating elements, or any combination thereof. Other similar types of elements also may be used and are within the scope of the present invention.

Referring again to FIG. 4, second mold 20 has at least one second contact surface 60 with at least one recessed element 70 in the form of a dish. Recessed element 70 is complementary to and cooperative with projecting element 50 of first mold 10. Second contact surface 60 also has a second level portion 62 about recessed element 70. Second contact surface 60 also may have surface elements 43 associated therewith. Second contact surface 60 may be interchangeably associated with second mold 20, and the second mold may be interchangeably associated with apparatus 1. The interchangeability of second contact surface 60 and/or second mold 20 provides apparatus 1 with further diversity in application or use.

Second mold 20, second contact surface 60, recessed element 70, and/or second level portion 62 may be heatable. Such heating may be accomplished in any of a variety of ways, such as, for example, by electric heating wires or rods associated with second mold 20. These heating wires or rods could conduct or transmit heat, via second mold 20, as appropriate to provide any and/or all of the aforementioned elements thereof with sufficient heat for effective molding under a variety of different molding parameters. Second mold 20 may be any shape, size, and/or configuration suitable for accomplishing one or more different molding operations in cooperation with mold 10. See, for example, FIGS. 7 and 8, which show alternative embodiments of second mold 20. It is noted that the present invention is not limited to those configurations discussed and/or shown and that other configurations also are within the scope of the present invention.

As with the first mold 10, surface elements 43 for providing a variety of different molding effects that may be on either or both recessed element 70 and second level portion 62 to interact with lofted assembly 36 during the molding process.

Figure 5:
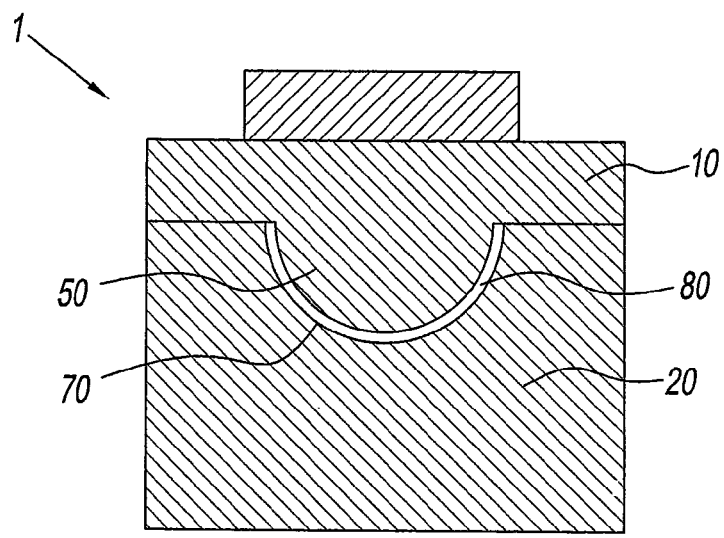
FIG. 5 is a cross-sectional side view of the apparatus of FIG. 4 with the apparatus shown in a closed position.
Figure 6:
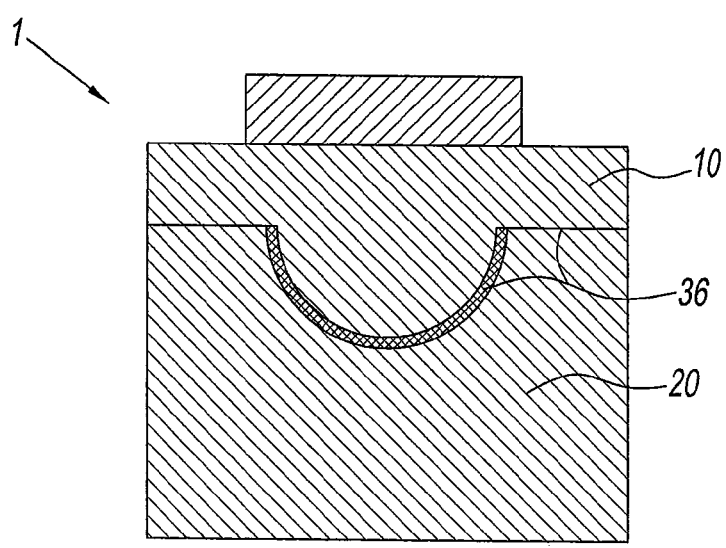
FIG. 6 is a side sectional view of the apparatus of FIG. 4, reflecting a forming step in accordance with an illustrative embodiment of the present invention.

Referring to FIGS. 5 and 6, having described some of the elements of an illustrative embodiment of the present invention, first and second molds 10, 20, respectively, may be configured to engage one another such that when first level portion 42 of first mold 10 and second level portion 62 of second mold 20 are brought into relatively close relation, a uniform preset distance or gap 80 is created between projecting element 50 and recessed element 70. In one embodiment, gap 80 has an extent of about 0.1 inches. However, gap 80 also may have any extent appropriate for accomplishing a desired molding operation. Hence, gap 80 may be adjusted to accommodate the loft characteristics associated with a variety of different materials. This adjusting feature may be accomplished in different ways, such as, for example, via the preferred interchangeability of first and second molds 10, 20 and/or first and second contacting surfaces 42, 62. Gap 80 also may be adjusted to influence the degree of loft associated with a material. That is, gap 80 may be reduced to provide a desired finish or effect to a lofted assembly 36. Thus, it is apparent that the preservation of the inherent loft characteristics associated with a lofted assembly is independent of the heat, pressure and/or time associated with a particular molding process. The present invention efficiently and effectively preserves the inherent loft characteristics associated with a lofted assembly during the molding process.

The process of molding lofted assembly 36 includes at least the following steps. Referring to FIG. 1, lofted assembly 36 is first positioned in apparatus 1 between first mold 10 and second mold 20. On lofted assembly 36, support fabric 32 is positioned so that after the molding process, support fabric 32 will be positioned at the lower side edge of the lofted assembly. Referring to FIG. 2, first mold 10 is then closed in relation to second mold 20, or vice-versa, to sandwich lofted assembly 36 therebetween. At least a portion of lofted material 30 is situated in gap 80 so that the inherent loft characteristics thereof are substantially preserved while at least another portion of lofted assembly 36 is substantially compressed between first and second level portions 42, 62 of first and second contact surfaces 40, 60, respectfully. Next, first mold 10 is opened in relation to second mold 20, or vice-versa, after an appropriate amount of heat and/or pressure has been applied for an appropriate period of time. Then, the molded lofted assembly is removed from apparatus 1 to perform any additional operations required for obtaining a desired effect, such as for example, eliminating any excess or unwanted material as appropriate to leave lofted assembly 36 with a three dimensional shape.

Referring to FIGS. 1 through 3 and 12, the molding process is capable of producing a three-dimensional lofted assembly 36, in the form of a breast-receiving cup 90 having at the lower lateral position, the support fabric 32. An advantage of the molding process is that cup 90 may be very deeply molded to accommodate wearers having larger breasts. The material of support fabric 32 is of such stitch pattern and material that it limits the elasticity of the lofted material 30 from which cup 90 is made. By limiting the elasticity of the lofted material 30, wearers who require substantial breast support may wear cup 90 with comfort and confidence.

The present invention having been thus described with particular reference to the exemplary embodiments, it will be obvious that various changes and modifications may be made therein without departing from the spirit and scope of the present invention as defined herein.

What is claimed is:

1. A method for molding a breast-receiving cup for a garment, comprising:
   positioning a support fabric on a lofted material;
   laminating the support fabric to the lofted material to form a lofted assembly;
   positioning the lofted assembly in a molding apparatus having a first mold and a second mold, the first mold having a projecting element and the second mold having a recessed element, the projecting element being dimensioned for insertion within the recessed element;
   closing together the first mold and the second mold while maintaining a uniform preset gap between the projecting element and the recessed element to form a molded lofted assembly in the shape of a breast-receiving cup with the support fabric positioned only at a lower lateral portion of the breast-receiving cup; and
   moving the first mold and second mold apart and removing the molded lofted assembly material from the apparatus.

2. The method of claim 1, wherein at least one of the projecting element and the recessed element is heated.

3. The method of claim 1, wherein each of the first mold and the second mold have level portions, the level portions compressing the lofted assembly when the first mold and second mold are closed together.

4. The method of claim 3, wherein at least one of the level portion of the first mold and the level portion of the second mold is heated.

5. The method of claim 1, wherein the laminating step occurs at a temperature of between about 320° F. and 360° F.

\* \* \* \* \*

UNITED STATES PATENT AND TRADEMARK OFFICE
CERTIFICATE OF CORRECTION

| | | |
|---|---|---|
| PATENT NO. | : 8,262,434 B2 | |
| APPLICATION NO. | : 12/652092 | |
| DATED | : September 11, 2012 | |
| INVENTOR(S) | : Gloria Falla, Roger D. Warren and Thomas S. Wood | |

It is certified that error appears in the above-identified patent and that said Letters Patent is hereby corrected as shown below:

Title page, item (73) Assignee, "BBI Branded Apparel Enterprises, LLC" should read --HBI Branded Apparel Enterprises, LLC--

Signed and Sealed this
Thirtieth Day of October, 2012

David J. Kappos
*Director of the United States Patent and Trademark Office*